SYNCHRONIZATION SYSTEM

Filed Oct. 1, 1948 3 Sheets-Sheet 1

INVENTOR.
Kurt Schlesinger
BY
Foorman L. Mueller
Atty

Feb. 10, 1953 K. SCHLESINGER 2,628,313

SYNCHRONIZATION SYSTEM

Filed Oct. 1, 1948 3 Sheets-Sheet 2

INVENTOR.
Kurt Schlesinger
BY
Foorman L. Mueller
Atty.

Feb. 10, 1953 K. SCHLESINGER 2,628,313

SYNCHRONIZATION SYSTEM

Filed Oct. 1, 1948 3 Sheets-Sheet 3

INVENTOR.
Kurt Schlesinger

BY

Foorman L. Mueller

Atty.

Patented Feb. 10, 1953 2,628,313

UNITED STATES PATENT OFFICE 2,628,313

SYNCHRONIZATION SYSTEM

Kurt Schlesinger, Maywood, Ill., assignor to Motorola, Inc., Chicago, Ill., a corporation of Illinois Application October 1, 1948, Serial No. 52,243

17 Claims. (Cl. 250—36)

This invention relates generally to synchronization systems and more particularly to a television synchronization system in which the effect of amplitude and phase variations in the synchronization signals are substantially eliminated.

It has been found that the synchronization pulses which are received in a television receiver are affected by noise and are subject to other variations so that direct control of the scanning systems thereby is not satisfactory. Although amplitude modulation of the synchronization pulses may be eliminated for the most part by clipping, noise may cause phase modulation of the synchronization pulses resulting in tearing or other distortion of the picture. To overcome this, various systems have been used. Automatic frequency control circuits have been provided to control free running oscillators so that the oscillators will maintain the same average frequency as the synchronization pulse but will not be positively locked thereto. These systems have required a plurality of tubes and other relatively expensive components and while providing generally satisfactory results, they have greatly increased the cost of television receivers. Filter systems have also been used and they have resulted in great improvement. Such a system is covered by my copending application, Serial No. 785,867, filed November 14, 1947, subject, Flywheel Synchronization System, now Patent No. 2,574,229. It is desired, however, to provide a system for linking a large number of lines together to provide more complete control.

It is, therefore, an object of this invention to provide a simple and inexpensive system for controlling a scanning generator of a television receiver by the average pulse repetition rate of synchronization signals without positively locking the generator with each pulse individually.

A further object of this invention is to provide a simple synchronizing system for a television receiver whereby the effects of phase variations of the synchronization pulses are eliminated.

A still further object of this invention is to provide a system for producing regularly spaced pulses of constant amplitude having the same average frequency and phase relationship as a pulse wave which may be irregular both in amplitude and phase.

A feature of this invention is the provision of an oscillator which is locked-in with synchronization pulses so that the output wave of the oscillator has the same average frequency as the synchronization pulses and is substantially in phase therewith.

A further feature of this invention is the provision of a Colpitts type oscillator including a low pass filter circuit into which synchronization pulses may be injected and which produces an output pulse wave which is synchronized with the repetition rate of the pulses.

A still further feature of this invention is the provision of a television synchronization system in which a single tube operating as a locked-in oscillator forms a high Q circuit which substantially reduces the effect of noise in the synchronization signal and provides a flywheel effect linking a large and controllable number of lines in the television picture.

Further objects, features and advantages of this invention will be apparent from a consideration of the following description when taken in connection with the accompanying drawings in which.

In practicing the invention an oscillator is locked in with synchronization pulses so that the frequency of the oscillator is equal to the repetition rate of the pulses. Pulses are then derived from the oscillator output which are used in synchronizing the horizontal deflection system. Arrangements are provided in which the pulse wave derived is in phase with the original synchronization pulses. This may be accomplished by having the oscillator in phase with the synchronization pulses and then clipping the peaks of the oscillator output. Alternately, the same result may be obtained by shifting the phase of the pulses by about 90° and locking the oscillator with the delayed pulses. Then the zero points of the oscillator output will be in phase with the synchronization pulses and by differentiation, pulses can be produced at the zero points which are suitable for controlling the scanning generator. This latter system can be provided using a Colpitts oscillator in which the tank circuit of the oscillator functions as a low pass filter into which the synchronization pulses are introduced. The filter provides noise protection and as it is tuned to the frequency of the synchronization pulses, acts as a resonant circuit to increase the fundamental frequency of the pulses and thereby provide sufficient sine wave amplitude for locking the oscillator. The filter also provides the 90° phase shift required so that the pulses produced by differentiation at the oscillator output are in phase with the original synchronization signals. The pulses are regularly spaced, of constant amplitude and in phase with the synchronization signal.

Figure 1:
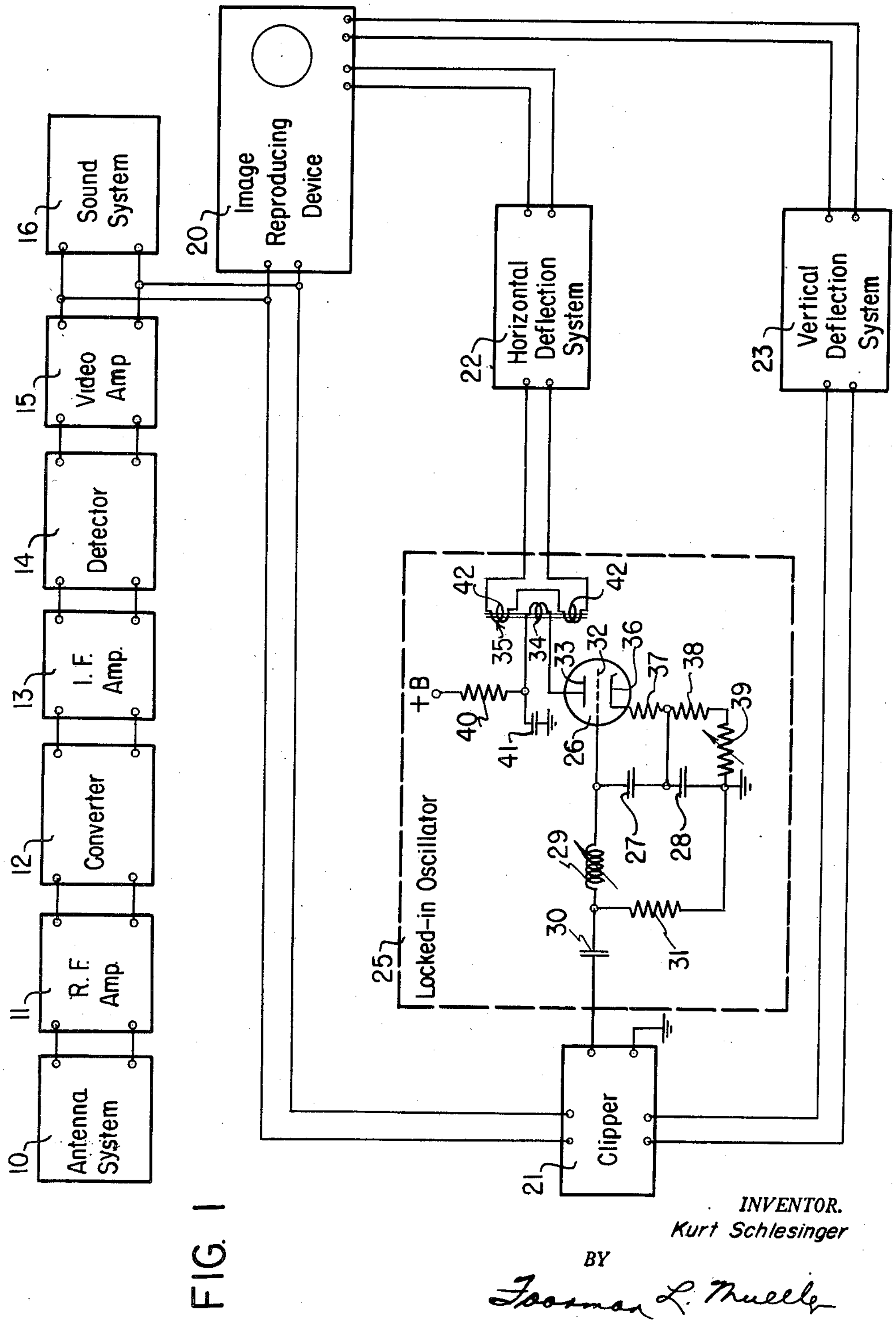
Fig. 1 illustrates the use of the synchronization system in accordance with the invention in a television receiver.

Referring now to the drawings, in Fig. 1, there is illustrated in block diagram a television receiver with the locked-in oscillator synchronization control shown in detail. The receiver includes an antenna system 10 arranged to intercept and select signals of predetermined frequencies. The signals from the antenna system are applied to radio frequency amplifier 11 wherein the strength is increased and the signals are further selected. The radio frequency signals are reduced to intermediate frequency by converter 12 and applied to intermediate frequency amplifier 13 in which the signal level is increased to a great extent. The sound and video signals may be removed from the radio frequency signal by detector 14 and then further amplified in video amplifier 15. A sound system 16 may be coupled to the video amplifier in the event that an intercarrier sound system is used or may be connected directly to the intermediate frequency amplifier if the video and sound signals are separately derived.

The video signal from amplifier 15 is applied to image reproducing device 20 wherein it is used for modulating the beam of a cathode ray tube or like device. The synchronization signals are also applied to clipper 21 which removes excess amplitudes. At its output, the horizontal and vertical synchronization signals are separated from each other for controlling the horizontal and vertical deflection systems 22 and 23 respectively. A locked-in oscillator 25 is coupled between the clipper 21 and the horizontal deflection system 22 for improving the synchronization pulses applied thereto. The horizontal and vertical deflection systems may provide scanning currents or voltages for deflecting the beam of image reproducing device, depending on whether an electromagnetic or an electrostatic deflection system is used.

Referring now more particularly to the locked-in oscillator 25, the oscillator of Fig. 1 is of the Colpitts type and includes a triode 26 and a resonant tank circuit with equal capacitors 27 and 28 for providing feedback and a variable tuning inductor 29. A resistor 37 is connected between the cathode 36 of the triode and the common connection between the capacitors for a reason to be explained hereinafter. Resistors 38 and 39 are bridged across capacitor 28, with resistor 39 being variable to provide fine tuning of the oscillator. The plate 33 of the triode 26 is connected to a primary winding 34 of an output transformer 35. Energy is applied to the plate 33 from +B through resistor 40, with condenser 41 providing a high frequency bypass. Line synchronization signals are applied through coupling condenser 30 to resistor 31 and provide a pulse voltage wave across this resistor. This voltage wave is applied through the low pass filter including inductor 29 and condensers 27 and 28 to the grid 32 of the triode.

Figure 2:
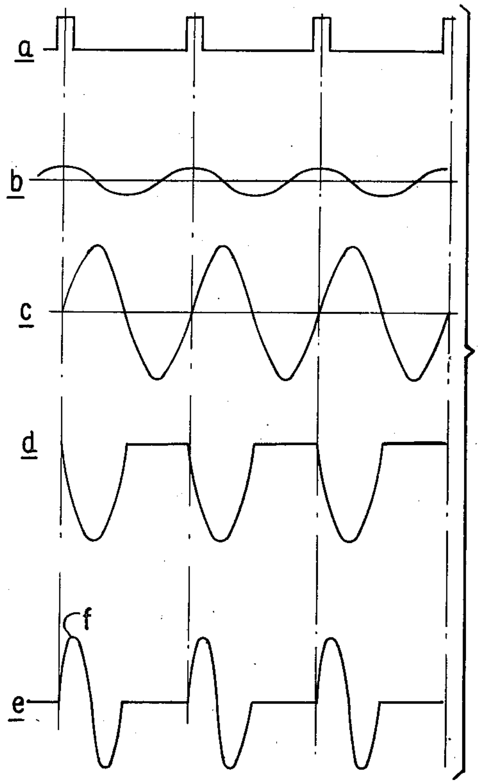
Fig. 2 is a curve chart illustrating the operation of the locked-in oscillator.

For an understanding of the operation of the oscillator, reference is made to Fig. 2. Curve *a* of Fig. 2 illustrates the pulse wave developed across resistor 31 and curve *b* shows the fundamental frequency of this wave. As is well known, the low pass filter will provide a phase shift so that the voltage appearing across the condensers 27 and 28 will lag the voltage across the resistor 31 by about 90 degrees. This voltage which is applied to the grid 32, is shown by curve *c* of Fig. 2. As the filter or resonant circuit is tuned substantially to the fundamental frequency of the synchronization pulses, the circuit will act to increase the amplitude of the fundamental frequency. This voltage applied to the Colpitts oscillator will lock the oscillator with the frequency of the synchronization pulses. The phase of the oscillator output will be the same as the voltage wave applied thereto. By properly biasing the tube 26 so that current will flow therein only during the positive portions of the wave applied to the grid 32, half-wave or pulse plate current is produced in the triode 26 as illustrated by curve *d*. This current wave is differentiated and inverted by the transformer 34 or an equivalent network, so that the voltage appearing in the secondary 42 thereof will take the form illustrated in curve *e*. The pulses are produced at the zeros in the oscillator output wave and are, therefore, substantially in phase with the received synchronization signals. It is noted that the positive pulses of curve *e* lag behind the received synchronization pulse by a slight amount indicated at *f* in curve *e*. This lag may not be objectionable but can be corrected as will be further described.

For satisfactory synchronization, the noise accompanying the synchronization signals must be materially reduced, and a large number of lines or cycles must be linked. The low pass filter formed by inductor 29 and condensers 27 and 28 is effective in reducing high frequency noise. The real noise protection, however, is due to the fundamental behavior of the locked oscillator. The number of lines or cycles which are linked by such a circuit depends upon the effective "Q" of the oscillator, which is larger than the actual Q of the tank circuit. By making the value of the inductor 29 large and the resistor 31 small, the actual Q of the tank circuit can be made relatively high. The use of a large inductor 29 is also advantageous in that it provides a high voltage on the grid 32. Resistor 31, however, must not be too small as this will result in a large phase shift (*f*, Fig. 2) with change in frequency which causes sideward shift of the picture. The effective Q of the circuit is considerably increased by the action of the oscillator. The actual Q of the circuit $$\left[\frac{X_L}{R}\right]$$

is in effect increased by the ratio of the oscillator voltage $E_o$ across resistor 31 with respect to the voltage $E_s$ produced across it by the synchronization signals. The noise protection, indicated by the number of lines locked, is equal to the effective Q divided by $\pi$ and in this case is equal to $$\frac{Q\,(\text{actual}) \times E_o/E_s}{\pi}$$

The results obtained become more apparent by writing this equation $$\frac{Q \times E_o}{\pi I_s R_{31}}$$

where $R_{31}$ is the value of resistor 31 and $I_s$ is the current produced in resistor 31 by the synchronization signal. It now becomes apparent that locking is inversely proportional to value of resistor 31 and to the amplitude of the synchronization signal current. This latter relationship is very advantageous as the noise protection increases with decreasing synchronization signals.

As shown in Fig. 2, a slight phase shift normally exists between the pulse wave produced by the oscillator and the synchronization pulses. This lag may be readily corrected and even overcompensated by a slight variation in tuning of the tank circuit, as by the resistor 39. However, the phase varies also with the difference in frequency of the oscillator and the synchronization pulse and is effective to cause a shift in the position of the picture in a television receiver. Such a frequency difference may be caused either by irregularities in the phase of the synchronization signals or by instability of the oscillator. The oscillator instability is due principally to variations in the transconductance ($G_m$) of the tube 26. Such variations of the transconductance may be caused by variation in cathode temperature (heater voltage) or in plate voltage (cathode current). It has been found that maximum stability is obtained when the transconductance $G_m$ is equal to four times the susceptance ($1/X$) of the circuit. As the inductance of the circuit must be high for satisfactory operation, as previously described, the susceptance will, therefore, be low and the transconductance must, therefore, be made low. In circuits actually used the transconductance must be lower than that of any standard tube and this can be readily met by providing a critical resistor in series with the cathode, as indicated at 37 of Fig. 1. The change in transconductance caused by varying plate voltage can be made less effective by using tubes having high mu as in such tubes variations in plate voltage cause less variations in the transconductance. By taking these precautions, the drift in phase and the corresponding shift in position of the picture may be held to a small amount which is not objectionable.

Another condition which must be met to provide maximum stability is that condensers 27 and 28 be exactly equal. It may be desirable to use a screen grid tube in place of the triode 26 to reduce the influence of the sweep circuits on the operation of the oscillator.

In circuits actually constructed the following values were found to be satisfactory:

| | |
|---|---|
| Condenser 30 | 250 micromicrofarads |
| Resistor 31 | 1,500 ohms |
| Inductor 29 | 150 millihenries |
| Condensers 27 and 28 | 1,500 micromicrofarads |
| Tube 26 | ½–6SL7 |
| Resistor 37 | 3,300 ohms |
| Resistor 38 | 10,000 ohms |
| Resistor 39 | 5,000 ohms |

In this circuit, operating at the horizontal deflection frequency (15,750 cycles), the reactance of inductor 29 is approximately 15,000 ohms. This provides an actual Q of the order of 10. The ratio of currents produced by the oscillator and the synchronization signal is on the order of 5 to 1. This provides an effective Q of about 50, which, in turn, provides a flywheel effect which links ($Q/\pi$) 15 to 20 lines. Much higher linkages may be obtained by simply reducing the value of resistor 31. For instance, with 500 ohms, 60 lines and more may be locked together. The susceptance of the circuit is $$\frac{1}{15,000}$$

and the required $G_m$ of the tube is, therefore $$\frac{1}{3,750}$$

As the 6SL7 tube used has a transconductance of the order of 1600 microhms, it is necessary to reduce this transconductance by the use of a resistor in series with the cathode and the 3,300 ohms resistor used was found to be optimum.

Figures 3, 4:
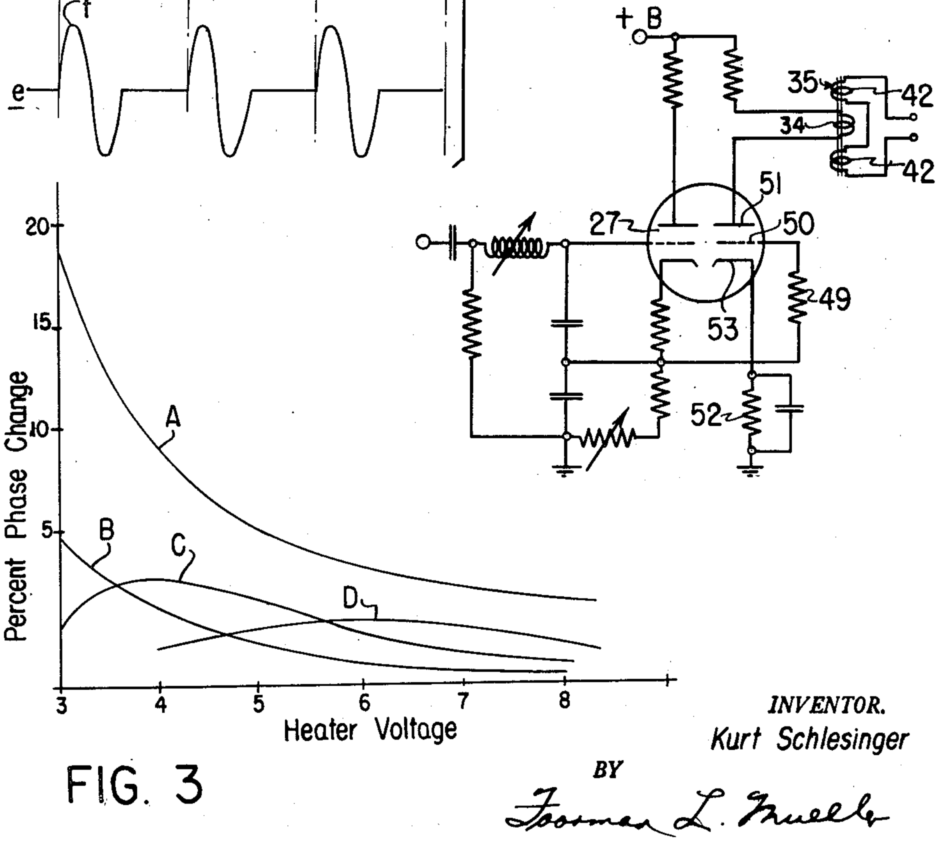
Fig. 3 illustrates the compensation for variations in transconductance, as caused by variations in filament voltage.

Fig. 3 illustrates the phase drift resulting from varying heater voltage. Curve A shows the variation with no cathode resistor, curve B shows the variation with a resistor of 1,000 ohms, curve C 2,200 ohms and curve D 3,300 ohms. It is noted that the phase remains substantially constant in the latter case, for heater voltages from 4 to 8 volts. This substantially eliminates the phase drift produced as the tube warms up. The 6SL7 tube used has a mu of the order of 70 so that changes in $G_m$ caused by variations in plate supply are negligible, between a voltage range of 100 to 300 volts.

By using the values specified above highly successful results were obtained. The noise reduction is sufficient for the worst conditions normally found. A sufficient number of horizontal lines are linked so that the vertical lines of the picture are straight and there is no tearing or other distortion. The sideward shift of the picture is not discernible, except for transmissions in which the synchronization signals have wide frequency variations. No difficulty is encountered with the master oscillator type synchronization signal generators now generally used.

As stated above, the lag of the output pulses of the oscillator with respect to the synchronization pulses can be eliminated. This may be accomplished by slight detuning of the Colpitts oscillator. Coarse tuning of the oscillator is accomplished by the variable inductor 29 which produces relatively large frequency changes, and fine tuning by variable resistor 39 which produces fine changes. Fine phase control can also be produced by the use of a vernier capacitor across the capacitor 28 or the use of a small variable inductor in series with inductor 29. The oscillator of course, must be held relatively close to the frequency of the synchronization pulse or locking will not occur on weak signals, but considerable variance is permitted. It is to be pointed out that the deflection system of the television receiver may be adjusted in some cases to compensate for the phase change introduced by the locked oscillator so that it is not necessary for the output pulses to be exactly in phase with the synchronization signals.

In Fig. 4 there is illustrated a system including a second triode section which is effective to increase the pulse amplitude from the oscillator and to decrease the delay in the pulses. The circuit is generally similar to that of Fig. 1 with the pulse wave being taken from the cathode of the triode section 27 and applied to the grid 50 of the second triode section through a limiting resistor 49. The output is then derived from plate 51 of the second triode section. The delay of the output pulse can be controlled by adjusting the cathode bias of the second triode, that is, by varying the value of resistor 52.

Figure 5:
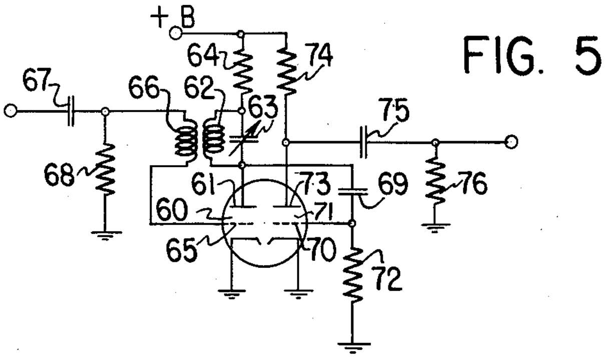
Figs. 4 and 5 illustrate modified locked-in oscillator systems.
Figure 6:
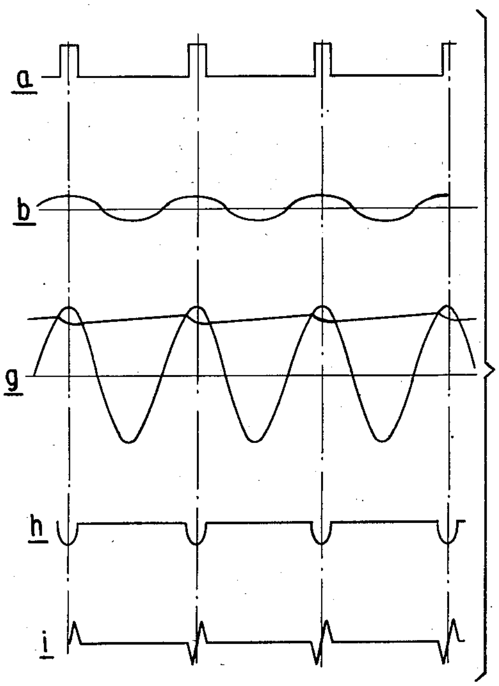
Fig. 6 illustrates the operation of the oscillator system of Fig. 5.

As previously stated, locked oscillators may also be used in which the oscillator is locked directly with the fundamental frequency of the synchronization signal and the peaks of the oscillator output clipped to provide synchronizing pulses. Such a system is illustrated in Figs. 5 and 6, with a Hartley oscillator being used. The oscillator includes a triode 60 having a plate 61 connected to a tuned circuit including inductor 62 and capacitor 63. The tuned circuit is connected through resistor 64 to +B potential. The triode includes a grid 65 which is connected to inductor 66, inductively coupled to inductor 62 to provide feedback to the grid circuit. The synchronization pulses are applied to the grid through capacitor 67 and across resistor 68. The output of the oscillator from the plate 61 is applied through coupling capacitor 69 to the grid 70 of a second triode section 71 which functions as a clipper. The grid 70 is biased by resistor 72 and potential is applied to the plate 73 through resistor 74. The triode 71 is biased so that current flows therein only during the peaks of the wave applied thereto. The output pulse may be differentiated by capacitor 75 and resistor 76 to provide very sharp pulses.

The operation of the system of Fig. 5 will be apparent from consideration of the curves of Fig. 6. Curve *a* indicates the synchronization pulses and curve *b* the fundamental component thereof. The synchronization pulses and the fundamental frequency thereof are, of course, identical to those illustrated in Fig. 2. Curve *g* illustrates the oscillator output which is in phase with the synchronization pulses as contrasted to the system of Fig. 1 in which the oscillator output is delayed. Curve *h* illustrates the output of the clipper 71 and curve *i* the differentiated output produced by the RC system. The locked oscillator produces noise protection in the same manner as in Fig. 1 so that amplitude and phase modulation of the synchronization signal are removed. The phase relationship of the output pulses with respect to the synchronization signals can be changed by detuning of the oscillator by the variable condenser 63.

It is, therefore, seen that there is provided locked-in oscillator circuits which furnish noise protection far in excess of a simple band pass filter. The circuits are arranged so that the synchronization pulses can be injected in such manner that the phase of the output wave from the oscillator is substantially the same as, and may be even advanced with respect to, the synchronization pulses permitting the output pulse wave to be used directly for controlling the deflection system of a television receiver. The locked oscillator provides both considerable noise reduction and the small phase shift which is required. The oscillator provides a great improvement over passive circuits in that the losses of the circuit are made up by the energy supplied by the oscillator so that the effective Q of the circuit is high and, therefore, linking of a greater number of lines is provided.

While certain embodiments of my invention which are illustrative thereof have been described, it is obvious that various changes and modifications can be made therein within the intended scope of the invention as defined in the appended claims.

I claim:

1. A system for producing synchronization pulses of constant frequency and amplitude from a source of pulses having the same average frequency comprising, an oscillator including an electron discharge valve having input and output electrodes and a resonant circuit, means for applying pulses from said source to said resonant circuit, said resonant circuit being sharply tuned to the fundamental frequency of said pulses for providing a sine wave of the fundamental frequency of said pulses and for applying the same to said input electrodes of said valve with a 90° phase delay, said valve being biased so that current flows in said output electrodes thereof only during the positive portions of the wave applied thereto, and a transformer connected to said output electrodes for producing pulses from said output current which are of constant frequency and amplitude and are substantially in time phase with said synchronization pulses.

2. A system for producing synchronization pulses of constant frequency and amplitude from a source of pulses having the same average frequency comprising, an electron discharge valve, a low pass filter for applying said pulses from said source to said valve as a sine wave delayed in phase by approximately 90°, means biassing said valve to provide output current only during a portion of each cycle of the wave applied thereto, and differentiating means for producing pulses from said output current which are substantially in time phase with said pulses from said source.

3. A system for producing synchronization pulses of constant frequency and amplitude from a source of pulses having the same average frequency comprising, an oscillator including an electron discharge valve, a low pass filter having high Q connected to said valve for applying the fundamental frequency of said pulses from said source thereto, said oscillator being locked with said pulses from said source to provide an output current wave of the same average frequency as said pulses, and differentiating means for producing pulses from said output current wave which are of constant frequency and amplitude, said oscillator and said filter being adjusted to produce such phase relationships that said produced pulses are substantially in time phase with said pulses from said source.

4. A system for producing regularly spaced pulses of constant amplitude having the same frequency as a received irregular pulse wave comprising, an oscillator including a resonant circuit and an electron discharge valve, said resonant circuit including a resistor across which said pulse wave is applied bridged by a large inductor and condenser means, said resonant circuit being tuned to the frequency of said received pulse wave so that the fundamental frequency thereof is amplified and higher frequencies are rejected, said condenser means being coupled to the input electrodes of said valve for applying said fundamental frequency thereto with a phase shift of approximately 90° for locking said oscillator therewith, and differentiating means for producing pulses at the zero points of the oscillator output wave so that the output pulse wave is substantially in phase with said received pulse wave.

5. A system for producing regularly spaced pulses of constant amplitude having the same frequency as a received irregular pulse wave comprising, an oscillator of the type including an electron discharge valve and a sharply tuned resonant circuit coupled thereto, means including said resonant circuit for applying the fundamental frequency of said received wave to said valve, said valve being biassed to provide intermittent output current, and differentiating means for producing output pulses from said output current which are of constant frequency and amplitude, said resonant circuit including tuning means for adjusting the phase of said output pulses with respect to said received pulse wave.

6. A system for producing regularly spaced pulses of constant amplitude having the same average frequency as a received pulse wave comprising, an oscillator having a resonant oscillating circuit which has a high Q, means for directly applying said received pulse wave to said resonant circuit, said resonant circuit being tuned to the fundamental frequency of said pulse wave and providing a sine wave at said fundamental frequency for locking said oscillator therewith, and means coupled to said oscillator for producing a pulse wave from the output of said oscillator which is substantially in phase with said received pulse wave.

7. A system for producing regularly spaced pulses of constant amplitude having the same average frequency as a received pulse wave comprising, an oscillator having a resonant oscillating circuit tuned to the fundamental frequency of said received pulse wave, means for directly applying said received pulse wave to said resonant circuit wherein the fundamental frequency of said received wave is emphasized for locking said oscillator therewith, and means coupled to said oscillator for producing a pulse wave from the output thereof, said resonant circuit being tunable to adjust the phase of said output pulse wave with respect to said received pulse wave.

8. A system for producing regularly spaced pulses of constant amplitude having the same average frequency as a received pulse wave comprising, an oscillator of the Colpitts type including an electron discharge valve and a resonant circuit connected to the cathode and grid thereof said resonant circuit including a low pass filter through which said received pulse wave is applied to said grid for locking said oscillator therewith, and a critical resistor in the connection from said cathode to said resonant circuit for minimizing the effect of changes in the transconductance of said valve on the frequency of said oscillator.

9. A system for producing regularly spaced pulses of constant amplitude having the same average frequency as a received pulse wave comprising, an oscillator including an electron discharge valve and a resonant oscillating circuit coupled thereto, means for directly applying said received pulse wave to said resonant circuit, said resonant circuit being tuned to the fundamental frequency of said received pulse wave and emphasizing the same for locking said oscillator therewith, said valve having a cathode, and a circuit connected to said cathode including a resistor for reducing the effect of changes in the transconductance of said valve on the frequency of said oscillator.

10. A system for producing regularly spaced pulses of constant amplitude having the same frequency as a received irregular pulse wave comprising, an oscillator of the Colpitts type including an electron discharge valve and a low pass oscillating resonant circuit coupled thereto, and means for directly applying said received pulse wave to said resonant circuit, said resonant circuit applying to said valve a sine wave of the fundamental frequency of said irregular pulse wave and delayed with respect thereto, said oscillator being locked-in by said voltage wave so that the frequency of said oscillator is equal to the average frequency of said received pulse wave, said resonant circuit including means for changing the amount of delay of said sine wave and thereby adjusting the phase of the output of said oscillator with respect to said received pulse wave.

11. A system for producing regularly spaced pulses of constant amplitude having the same frequency as a received irregular pulse wave comprising, an oscillator of the Colpitts type including an electron discharge valve and a low pass oscillating resonant circuit coupled thereto, means for directly applying said received pulse wave to said resonant circuit, said resonant circuit applying to said valve a sine wave having the same frequency as the fundamental frequency of said pulse wave and delayed with respect thereto, a cathode circuit for said valve including a resistor for reducing variations in the frequency of said oscillator caused by changes in the transconductance of said valve, and differentiating means coupled to said oscillator for producing pulses which are of constant frequency and amplitude, said resonant circuit including adjustable means for controlling the delay of said sine wave and thereby varying the phase of said output pulses with respect to said received pulse wave.

12. A system for producing regularly spaced pulses of constant amplitude having the same frequency as a received irregular pulse wave comprising, an oscillator of the Colpitts type including an electron discharge valve and a resonant circuit coupled thereto having relatively large inductance and relatively small resistance, means for applying said pulse wave to said resistance, said pulse wave being shifted in phase and applied to said valve for controlling the frequency of said oscillator, a resistor connecting said cathode to said resonant circuit for reducing variations in the frequency of said oscillator caused by changes in the transconductance of said valve, and differentiating means coupled to said oscillator for producing pulses which are of constant frequency and amplitude, said resonant circuit being tuned so that said output pulses are substantially in phase with said received pulse wave.

13. A system for producing regularly spaced pulses of constant amplitude having the same average frequency as a received pulse wave comprising, an oscillator, means for applying to said oscillator a sine wave having the same frequency as the fundamental frequency of said pulse wave and delayed with respect thereto for locking said oscillator therewith, and means for clipping the peaks of the output wave of said oscillator to provide a pulse wave which is substantially in phase with said received pulse wave.

14. A system for producing regularly spaced pulses of constant amplitude having the same frequency as a received irregular pulse wave comprising, an oscillator including a tunable resonant circuit having a natural frequency equal to the fundamental frequency of said pulse wave, means including said resonant circuit for applying said pulse wave to said oscillator for locking said oscillator therewith, and clipping and differentiating means for producing pulses from said output of said oscillator, said resonant circuit being tuned to control the phase of the wave applied to said oscillator so that said output pulses are substantially in time phase with said received pulse wave.

15. In a synchronization system, the method of operating an oscillator having a tuned circuit to provide a regular pulse wave of constant amplitude having the same frequency as a received irregular pulse wave, comprising the steps of applying said received pulse wave to said tuned circuit of said oscillator for emphasizing the fundamental frequency of said received pulse wave, locking the oscillator with the fundamental frequency of said irregular wave, producing a pulse wave from the output wave of the oscillator, and adjusting the tuned circuit so that the irregular pulse wave is delayed thereby and the produced pulse wave is substantially in phase with the received pulse wave.

16. A system for producing a synchronization pulse wave of constant repetition rate from a first pulse wave having the same average repetition rate and which is subject to undesired phase modulation, said system including in combination, resonant circuit means tuned substantially to the fundamental frequency of said pulse waves, means for directly applying said first pulse wave to said resonant circuit means, means including an electron discharge valve coupled to said resonant circuit means for sustaining oscillations therein at said fundamental frequency so that a wave of substantially sinusoidal wave form is built up in said resonant circuit means, said resonant circuit means being tuned to provide a predetermined phase relation between said first pulse wave and said wave built-up in said resonant circuit means, and means coupled to said valve for producing from said built-up wave a pulse wave having constant frequency and with the pulses thereof occurring in substantially the same time phase relationship as the pulses of said first pulse wave.

17. A system for producing a synchronization pulse wave of constant frequency and amplitude from a source pulse wave having the same average frequency and being subject to phase modulation resulting from noise, said system including in combination, resonant circuit means tuned substantially to the fundamental frequency of said pulse waves, means for directly applying said source pulse wave to said resonant circuit means, an electron discharge valve coupled to said resonant circuit means and forming an oscillator therewith for sustaining oscillations in said resonant circuit means at said fundamental frequency, whereby a substantially sinusoidal wave is produced in said resonant circuit means having the same average frequency as said source pulse wave and a predetermined phase relation with respect thereto, and means coupled to said oscillator for producing from said sinusoidal wave a pulse wave having constant frequency and amplitude and being substantially in phase with said source pulse wave.

KURT SCHLESINGER.

REFERENCES CITED

The following references are of record in the file of this patent:

UNITED STATES PATENTS

| Number | Name | Date |
|---|---|---|
| 2,181,572 | Bowman-Manifold et al. | Nov. 28, 1939 |
| 2,196,845 | Andrien | Apr. 9, 1940 |
| 2,227,066 | Cork et al. | Dec. 31, 1940 |
| 2,277,000 | Bingley | Mar. 17, 1942 |
| 2,305,930 | Martinelli | Dec. 22, 1942 |
| 2,416,368 | Young, Jr. | Feb. 25, 1947 |
| 2,422,231 | Francis et al. | June 17, 1947 |
| 2,437,690 | Goldmark | Mar. 16, 1948 |
| 2,440,653 | Corrington | Apr. 27, 1948 |
| 2,444,437 | Grieg | July 6, 1948 |
| 2,457,974 | Bliss | Jan. 4, 1949 |

FOREIGN PATENTS

| Number | Country | Date |
|---|---|---|
| 535,905 | Great Britain | Apr. 25, 1941 |
| 582,231 | Great Britain | Nov. 8, 1946 |